Patented Mar. 7, 1950

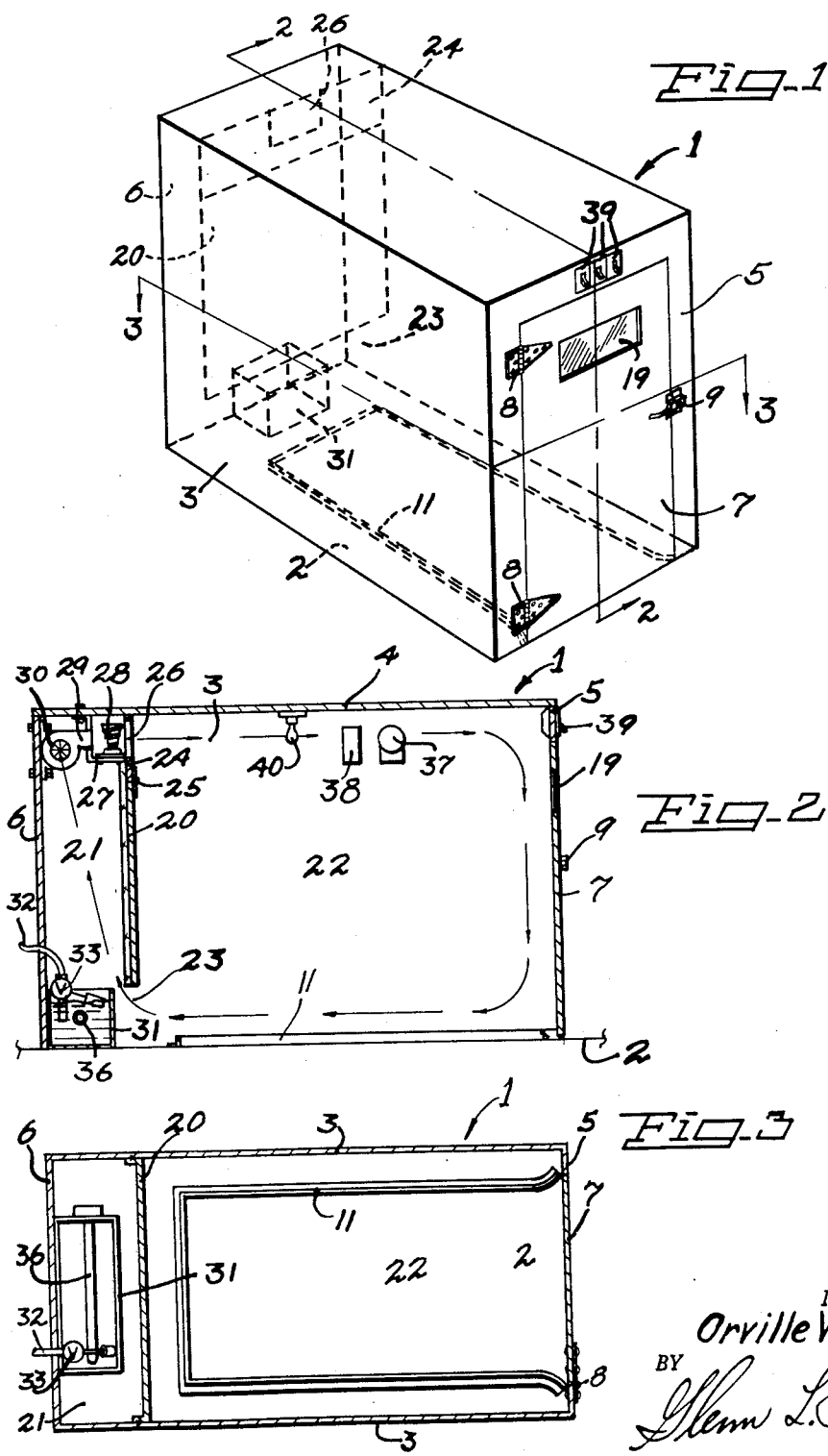

2,499,525

UNITED STATES PATENT OFFICE 2,499,525

DOUGH RAISING BOX

Orville W. Person, Spokane, Wash.

Application November 13, 1948, Serial No. 59,959

2 Claims. (Cl. 219—39)

This invention relates to a raising box which is intended for use in bakeries. When dough for yeast bread and the like is placed in pans which are set upon shelves and allowed to rise variations in room temperature and humidity sometimes have a bad effect upon the dough and prevent it from rising properly. Therefore one object of the invention is to provide a box constituting a chamber in which pans of dough may be placed and allowed to rise in air which is held at a predetermined temperature and humidity.

Another object of the invention is to provide a box wherein air is circulated between ends of the chamber and in doing so flows past a heating element and a pan filled with water which supply the necessary heat and moisture to the air.

Another object of the invention is to provide a box having therein a thermostat for controlling operation of a fan by means of which air is circulated in the box and also a humidity meter by means of which a submerged water heater is shut off and turned on when necessary.

Another object of the invention is to provide a box of this character which is simple in construction, efficient in operation, and has its elements so arranged that the interior of the box will be unobstructed for the major portion of its length and thus allow a large number of pans to be placed in the box.

The invention is illustrated in the accompanying drawings wherein:

Fig. 1 is a perspective view of the improved box.

Fig. 2 is a longitudinal sectional view taken vertically through the box along the line 2—2 of Figure 1.

Fig. 3 is a sectional view taken horizontally through the box along the line 3—3 of Figure 1.

This improved box which is indicated in general by the numeral 1 may be formed of sheet metal or other suitable material. The box rests upon a floor 2, and has side walls 3, a top 4, and front and rear walls 5 and 6. An opening is formed through the front wall 5 and this opening is closed by a door 7 which is mounted for opening and closing movement by hinges 8 and releasably held closed by a latch 9. A window 10 is provided in the upper portion of the door 7 so that a person may view dough rising in the box without opening the door. A U-shaped guide 11 extends longitudinally of the box upon the floor 2 so that when pans of dough, on wheeled racks (not shown) are placed in the box, they may be centered to avoid direct contact with the box.

A vertical partition 20 extending transversely of the box and having its lower end spaced from the floor 2 defines an auxiliary chamber or compartment 21 located back of the main chamber 22 and communicating therewith by way of a passage 23 under the lower edge of the partition. The upper end of the partition is connected to a plate 24 by hinges 25 and midway its width the mounting plate is formed with an opening 26 back of which is a shelf 27. Upon this shelf is a heater 28 and through the rear wall of the shelf passes the nozzle 29 of a blower 30 which is bolted to the rear wall 6 of the box. Air from the blower passes through the opening 26 and is heated by the heater when the heater is in operation, and upon referring to Figure 2 it will be seen that when the fan or blower is in operation air will move forwardly through the chamber 22 to the front wall and then downwardly to the bottom of the chamber and rearwardly to the passage 23 through which it passes and then upwardly through the rear chamber 21 to the blower. This is indicated by the arrows in Figure 2 and will provide a continuous circulation of air through the chamber 22 when the fan is in operation. A water receptacle or pan 31 rests upon the bottom of the box midway the width of the lower end of the rear chamber or compartment 21 and is spaced from the partition so that air may flow upwardly into this chamber without interference by the water receptacle. Water is supplied to the receptacle through a pipe 32 and a float valve 33 in the receptacle controls flow of water into the receptacle so that water cannot overflow from the receptacle. A water heater 36 is mounted in the water receptacle below the level of water therein and when it is in operation vapor will rise from the water and supply moisture to the air in the box. A humidity meter 37 which is in circuit with the water heater 36 controls operation of the submerged water heater 36 for the water and a thermostat 38 which is in circuit with a heater 28 turns this heater on or off in response to predetermined changes in temperature within the box. The fan 30 runs continuously, unless manually turned off. The circuits for the heaters and the fan are not shown as they are conventional circuits, but there have been shown switches 39 for the circuits located above the front door 7 where they can be conveniently reached by a person having charge of the box. An electric bulb 40 is provided within the box so that the chamber 22 may be illuminated and thus allow a person looking through the window 10 to clearly see pans of dough and determine whether the dough has finished rising.

When this box is in use pans of dough are placed upon wheeled racks (not shown) whereupon said racks are rolled through the front opening and centered by guide 11, the door 7 being then closed, air is circulated in the chamber 22 by the fan 30 and as this air passes the heater 28 its temperature will be raised until it reaches a predetermined degree, at which point the thermostat 38 shuts off the heater so that it is rendered inoperative until the temperature has decreased to a point at which the thermostat closes the circuit through the heater. The water in the plan or receptacle 31 is heated by the submerged heater 36 and gives off vapor which is taken up by air moving upwardly through the rear chamber 21. When the moisture content of the air reaches a predetermined point the meter 37 shuts off flow of current through the submerged heater 36 and heating of the water will be stopped until the moisture content of the air is decreased to a point at which the meter closes the circuit for the submerged heater. The air in the box will thus be kept within predetermined ranges of heat and moisture and rising of dough will take place in a box filled with air of substantially an even temperature and humidity. If material is placed in the box which should be subject to air of a temperature or humidity higher or lower than provided for by the thermostat and the meter the switches 39 controlling flow of current through their circuits may be moved to an opened position and thus cut off automatic control of the thermostat and the meter.

Having thus described the invention, what is claimed is:

1. A dough raising box comprising a casing having an entrance in its front and a door for closing the entrance, a vertical partition in said casing extending transversely therein and defining a main compartment and a rear compartment communicating with the main compartment through space between the lower end of the partition and the bottom of the casing, there being an opening through the upper portion of the partition, a fan mounted in the rear compartment back of the opening and creating an air current in the main compartment forwardly therein and then downwardly and rearwardly along the bottom of the casing and upwardly through the rear compartment back to the fan, an electric heater between the fan and the opening in the partition for heating air blown forwardly by the fan, a thermostat in the main compartment controlling operation of the heater, a water receptacle at the bottom of the rear compartment about which air flows as it enters the rear compartment through the space under the partition, a water pipe, a float valve in the receptacle controlling flow of water from the pipe into the receptacle, an electrical water heater in the receptacle, and a humidity meter in the main compartment controlling operation of the water heater.

2. A dough raising box comprising a casing having a front entrance and a door for the same, a vertical partition dividing the casing into a main compartment and an auxiliary compartment communicating with the main compartment through upper and lower openings, a shelf mounted back of the partition substantially at the lower edge of the upper opening, an electrical heater upon said shelf back of the upper opening, a fan for circulating air longitudinally through the main compartment and vertically through the auxiliary compartment mounted in the upper portion of the said auxiliary compartment and having an outlet neck extending forwardly towards the heater and the upper opening, the air being heated as it passes the heater, a thermostat in the main compartment for automatically controlling operation of said heater, a water receptacle in the auxiliary compartment back of the lower opening, a water heater associated with said water receptacle for heating water therein and thereby supplying moisture to air passing through the auxiliary compartment, and a humidity meter in the main compartment for automatically controlling operation of said meter.

ORVILLE W. PERSON.

REFERENCES CITED

The following references are of record in the file of this patent:

UNITED STATES PATENTS

| Number | Name | Date |
|---|---|---|
| 2,201,389 | De Give | May 21, 1940 |
| 2,236,359 | Armstrong | Mar. 25, 1941 |
| 2,408,331 | Mills | Sept. 24, 1946 |
| 2,454,370 | Beaubien | Nov. 23, 1948 |